US011097784B2

(12) United States Patent
Kaneb

(10) Patent No.: US 11,097,784 B2
(45) Date of Patent: Aug. 24, 2021

(54) SHOCK TOWER FOR A VEHICLE

(71) Applicants: MAGNA INTERNATIONAL INC., Aurora (CA); Charles Peckitt Kaneb, Shelby Township, MI (US)

(72) Inventor: Charles Peckitt Kaneb, Shelby Township, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 75 days.

(21) Appl. No.: 16/483,528

(22) PCT Filed: Feb. 6, 2018

(86) PCT No.: PCT/US2018/017047
§ 371 (c)(1),
(2) Date: Aug. 5, 2019

(87) PCT Pub. No.: WO2018/148200
PCT Pub. Date: Aug. 16, 2018

(65) Prior Publication Data
US 2020/0189663 A1 Jun. 18, 2020

Related U.S. Application Data

(60) Provisional application No. 62/455,684, filed on Feb. 7, 2017.

(51) Int. Cl.
*B62D 25/08* (2006.01)
(52) U.S. Cl.
CPC .................. *B62D 25/088* (2013.01)
(58) Field of Classification Search
CPC ................................................... B62D 25/088

(Continued)

(56) References Cited

U.S. PATENT DOCUMENTS 5,456,517 A 10/1995 Kalian et al.
9,517,798 B2 * 12/2016 Matsuo .................. B62D 21/03
(Continued)

FOREIGN PATENT DOCUMENTS

DE 102015204895 A1 * 9/2016 ........... B62D 25/088
EP 2955084 A1 12/2015
(Continued)

OTHER PUBLICATIONS

English language translation of the abstractor DE 10 2015 204895 A1 (Year: 2016).*
(Continued)

*Primary Examiner* — Joseph D. Pape
(74) *Attorney, Agent, or Firm* — Dickinson Wright PLLC

(57) ABSTRACT

A shock tower for a vehicle includes a body having an upper portion and a lower portion. The body includes a hub disposed along the upper portion and a rim extending along the lower portion. A plurality of first spokes extend between the hub and the rim for carrying or distributing a load from the shock tower to a portion of the vehicle. A plurality of second spokes extend at least partially around the body and transversely to respective ones of the first spokes to define a plurality of spoke junctions for allowing the distributed load to change directions at each intersection of the second spokes with the first spokes. A plurality of third spokes each extend angularly from one of the first spokes to the rim. The spokes collectively define voids for removing material from the shock tower and reducing an overall weight of the shock tower component.

20 Claims, 5 Drawing Sheets

(58) Field of Classification Search
USPC .................................................. 296/193.09
See application file for complete search history.

(56) References Cited

U.S. PATENT DOCUMENTS

| | | |
|---|---|---|
| 2012/0242111 A1 | 9/2012 | Mildner et al. |
| 2015/0314811 A1* | 11/2015 | Shibata ................ B62D 25/082 |
| | | 296/193.09 |
| 2016/0129946 A1* | 5/2016 | Drewes ................ B62D 25/088 |
| | | 296/193.01 |
| 2016/0264176 A1 | 9/2016 | Balzer et al. |
| 2016/0355064 A1 | 12/2016 | Amemiya |

FOREIGN PATENT DOCUMENTS

| | | |
|---|---|---|
| FR | 2967965 A1 | 6/2012 |
| WO | 2016146293 A1 | 9/2016 |

OTHER PUBLICATIONS

European Search Report regarding corresponding EP App. No. 18750691.0; dated Nov. 4, 2020.

* cited by examiner

SHOCK TOWER FOR A VEHICLE

CROSS REFERENCE TO RELATED APPLICATIONS

This U.S. National Stage Patent Application claims the benefit of PCT International Patent Application Serial No. PCT/US2018/017047 filed Feb. 6, 2018 entitled "Shock Tower For A Vehicle" which claims the benefit of U.S. Provisional Patent Application Ser. No. 62/455,684 filed Feb. 7, 2017 entitled "Shock Tower For A Vehicle," the entire disclosures of the applications being considered part of the disclosure of this application and hereby incorporated by reference.

BACKGROUND OF THE INVENTION

1. Field of the Invention

The present invention relates generally to a shock tower provided in a front portion of a vehicle to mount an upper end of a strut or shock absorber.

2. Related Art

Shock towers are well-known vehicular body parts. Generally, a shock tower is secured to a portion of an engine compartment and provides an attachment or mounting surface for receiving an upper end of a spring and damper, or a McPherson strut. Such shock towers are commonly formed using sheet metal fabrication techniques. For example, shock towers are traditionally formed from combining multiple pieces of stamped steel components. In other instances, the multiple stamped metal components are replaced with a shock tower cast from steel. However, shock towers formed from multiple stamped steel components or as a single cast member are very heavy and thus are not a viable solution to reduce the overall weight of a vehicle.

In some instances shock towers have been formed from aluminum, such as by High Pressure Vacuum Die Casting (HPVDC), to provide an aluminum shock tower that is lighter than its steel counterpart. However, the aluminum shock tower is more expensive than a steel shock tower, namely because the process for manufacturing the aluminum shock tower by HPVDC is very complex. In addition, the aluminum shock towers are often over-engineered to address problems with the manufacturing process and insure the aluminum shock tower provides the necessary structural integrity. The added expense and design features undermine the very benefit the aluminum-based shock towers were intended to achieve. In addition, it can also be difficult to secure the aluminum shock tower to a portion of the engine compartment which is comprised of steel. Thus, these aluminum shock towers often require mechanical fasteners, such as rivets, to secure the shock tower to a portion of the engine compartment.

In even other instances, the shock tower is cast from magnesium or a magnesium alloy to overcome the aforementioned problems with steel and aluminum based shock towers. One such example is disclosed in US 2016/026416 to Balzer, et al. While use of magnesium provides for a reduced mass shock tower because it is based on a material having a density that is ⅔ that of aluminum, the magnesium cast shock tower necessarily requires additional components, such as a steel bridging bracket, to secure the magnesium cast shock tower to a portion of the engine compartment. In addition, the magnesium cast shock tower also requires the use of insulation to provide a barrier between the magnesium cast shock tower and the engine compartment to avoid corrosion of the magnesium shock tower.

Thus, there remains a significant and continuing need for a simpler design of a shock tower which includes fewer components and is less expensive while still contributing to the goal of reducing the overall weight of the vehicle into which the shock tower is incorporated.

BRIEF DESCRIPTION OF THE DRAWINGS

These and other features and advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
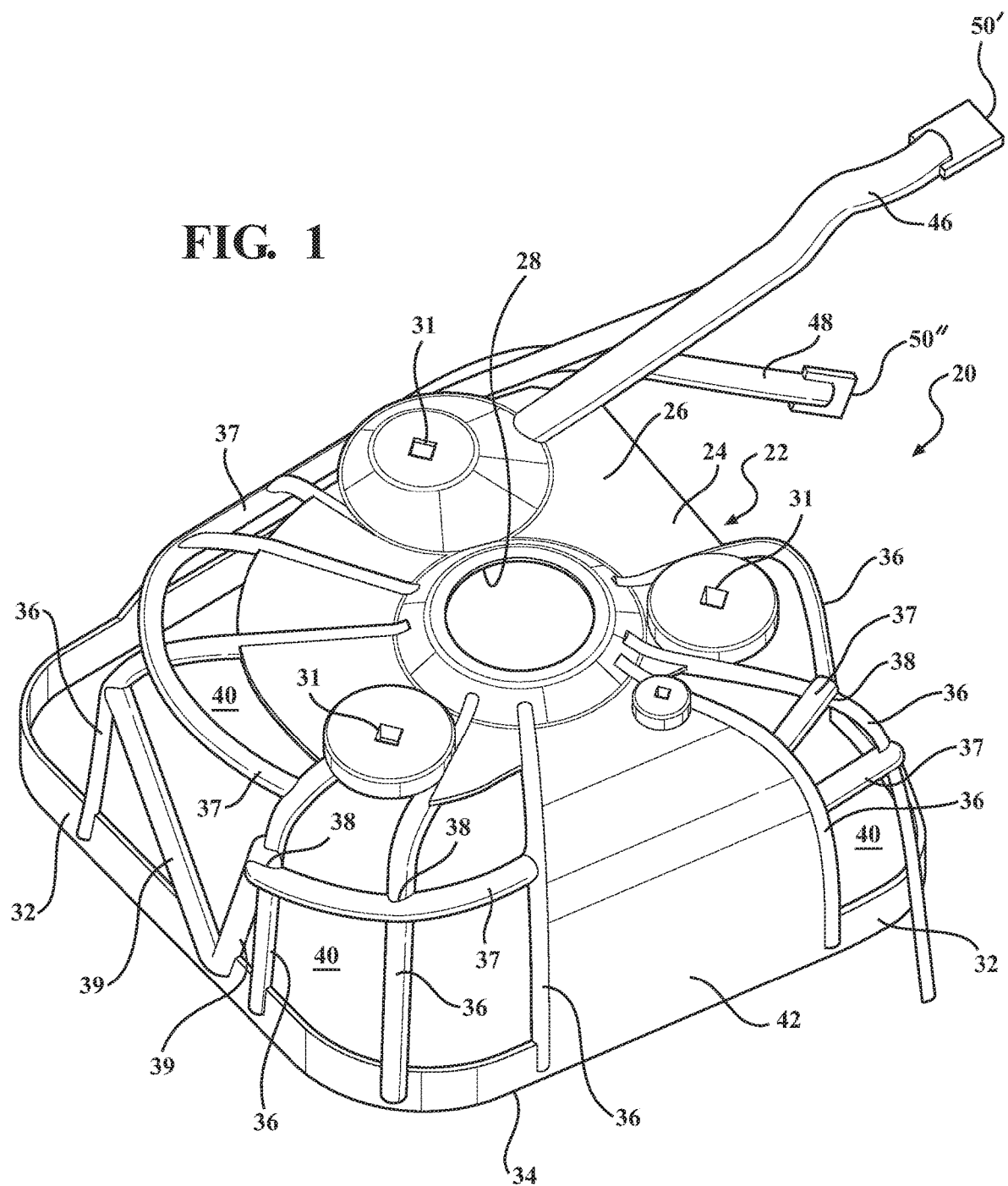
FIG. 1 is a perspective view of a shock tower in accordance with the subject disclosure.
Figure 2:
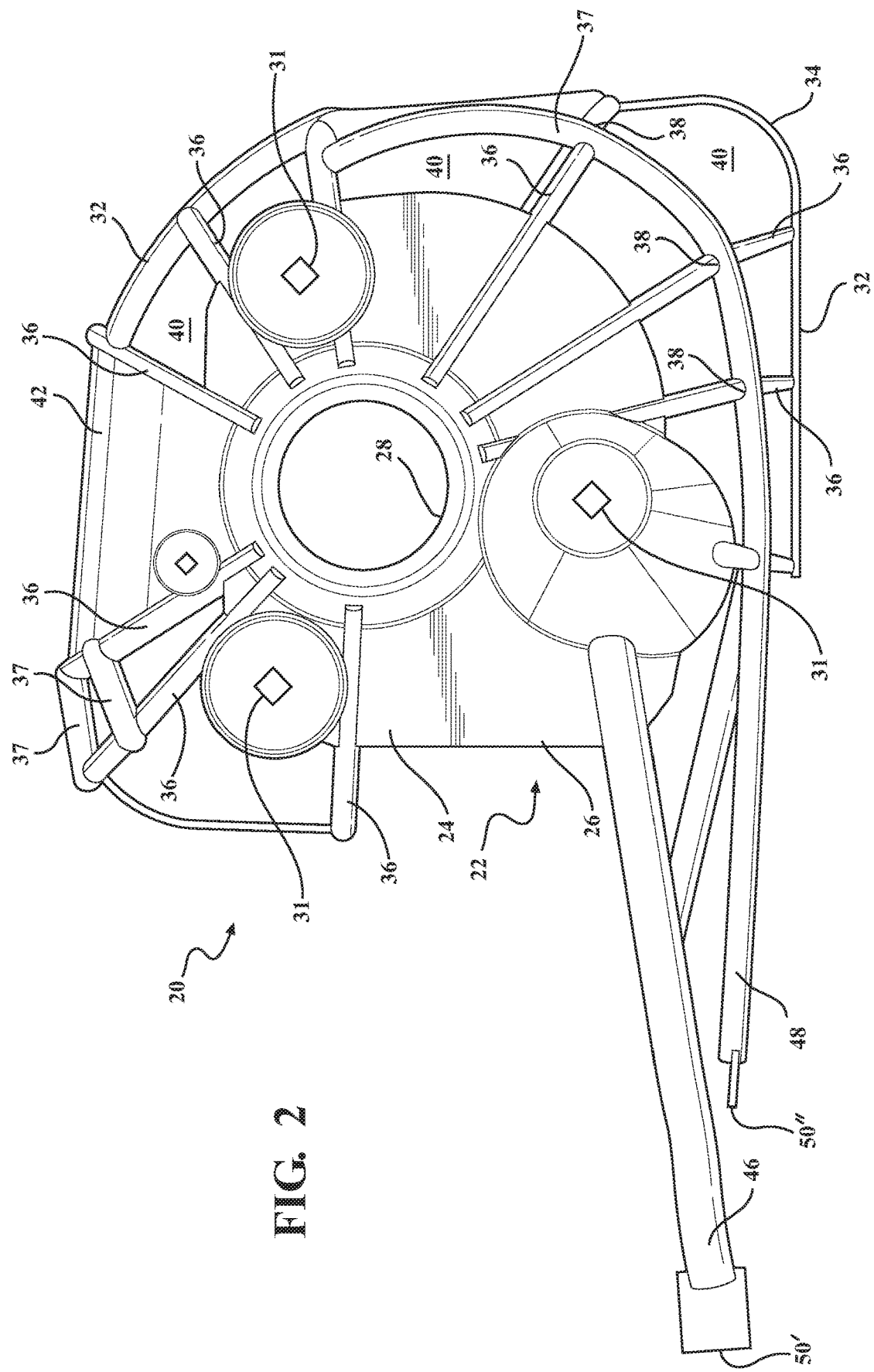
FIG. 2 is a top view of the shock tower.

Referring to the drawings, wherein like numerals indicate corresponding parts throughout the several views, an exemplary shock tower 20 constructed in accordance with an aspect of the present invention is generally shown in FIGS. 1-5. In a preferred arrangement, the shock tower 20 is cast from steel to provide a shock tower that is comprised of a material sufficiently similar to the frame rails and load beams of the engine compartment so that the shock tower 20 can be joined to the engine compartment via welding. This eliminates the need for mechanical fasteners or bonded joints to establish the attachment between the shock tower 20 and the engine compartment.

Figure 3:
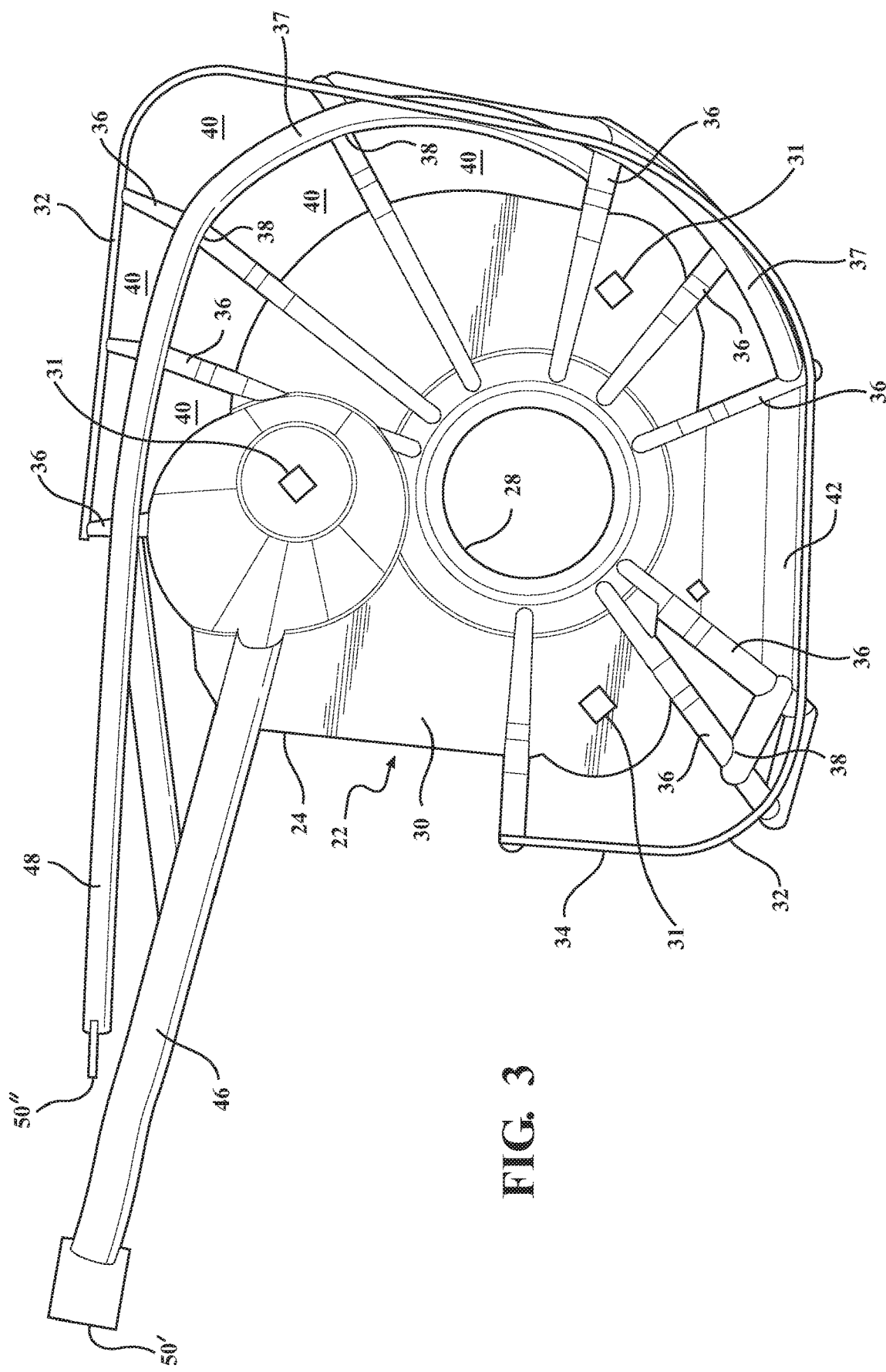
FIG. 3 is a bottom view of the shock tower.
Figure 4:
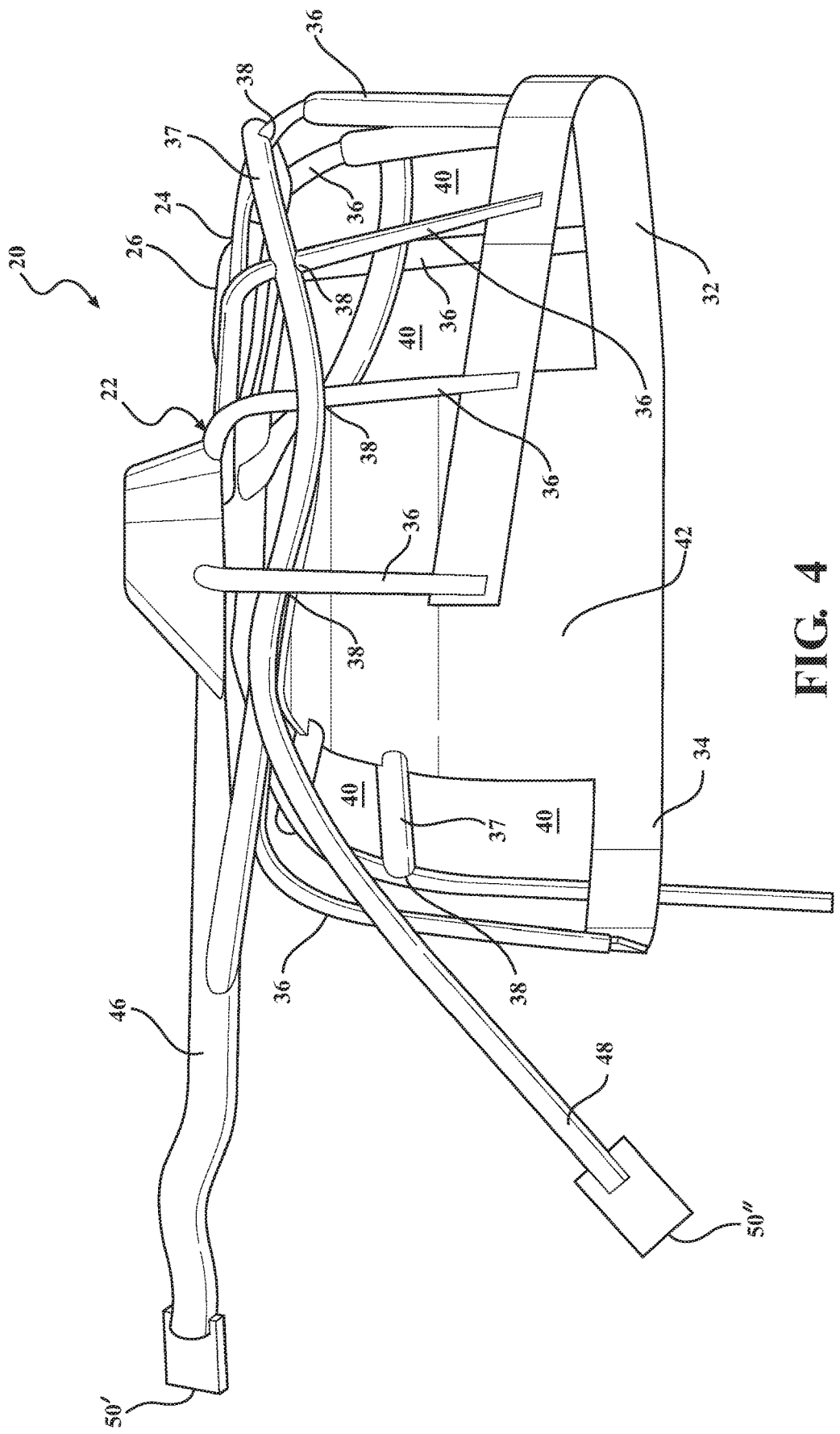
FIG. 4 is a side view of the shock tower.

As illustrated in FIGS. 1-5, the shock tower 20 includes a body 22 that is preferably cast from steel as one unitary piece and extends between an upper portion 24 and a lower portion 34. The body 22 includes a cap or hub 26 disposed about and extending along the upper portion 24 of the cast shock tower 20 that defines a central opening 28 for receiving an upper end of the strut or shock absorber. As best shown in FIG. 3, the cap or hub 26 has an underside surface 30 and also defines a plurality of fastener holes 31 for receiving or attaching the strut or shock absorber and any associated mount assembly (not expressly shown).

As further illustrated in FIGS. 1-5, the body 22 includes a rim 32 extending around and along the lower portion 34 of the shock tower 20 for securement to another portion of the engine compartment, such as the load beam. As previously mentioned, since almost all of the body 22 is unitarily cast from steel, the rim 32 is also a thin cast steel wall that facilitates the securement of the rim 32 to the sheet steel engine compartment via welding.

Figure 5:
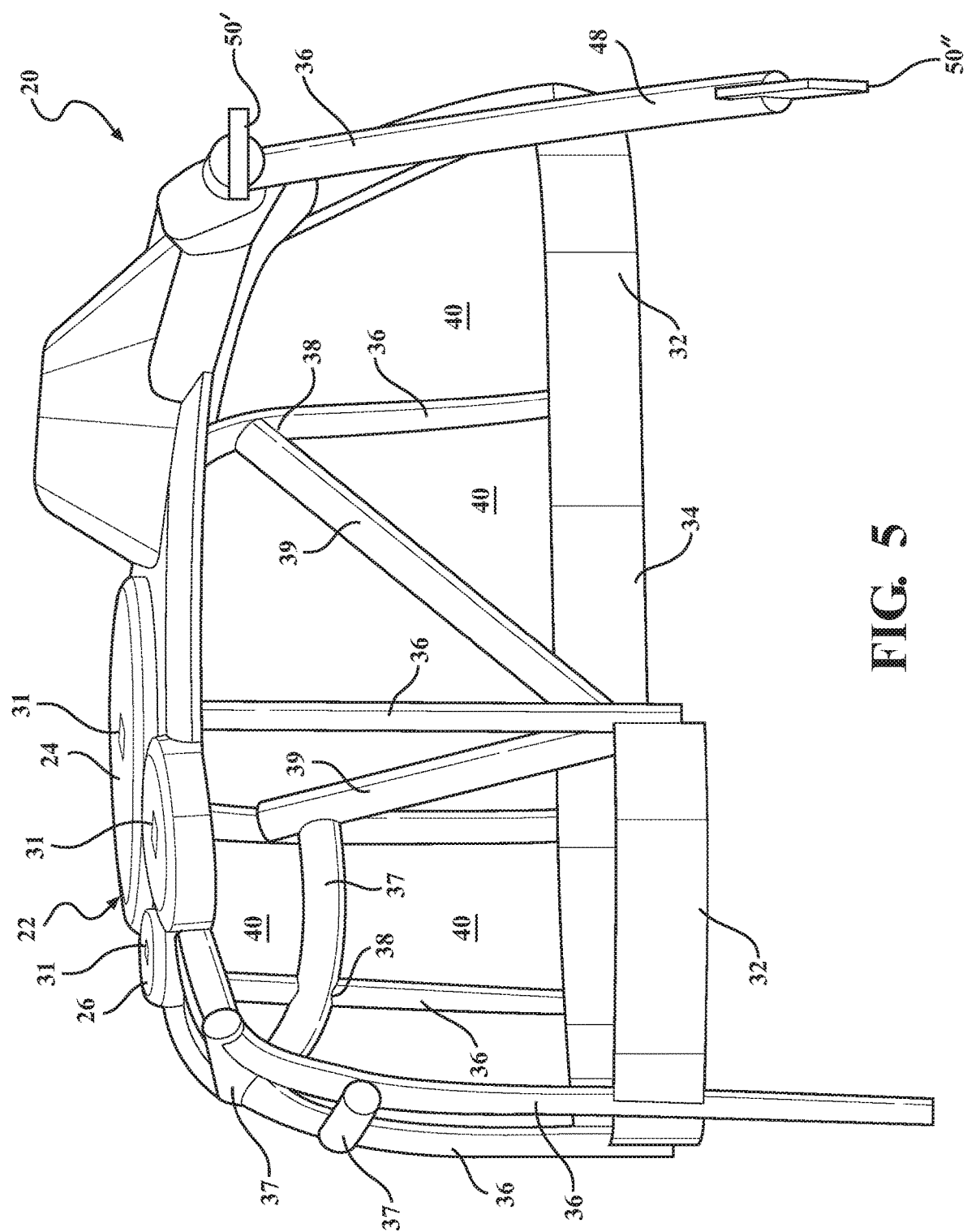
FIG. 5 is an end side view of the shock tower.

The body 22 includes a plurality of first spokes 36 which extend between the hub 26 and the rim 32 for carrying or distributing a load from the cast shock tower 20 to the engine compartment. The body 22 also includes a plurality of second spokes 37 which extend at least partially around the body 22 in transverse relationship to respective ones of the plurality of first spokes 36 to intersect the respective ones of the plurality of first spokes 26 at spoke junctions 38 for allowing the distributed load to change directions at each of the spoke junctions 38. As best illustrated in FIGS. 1 and 5, the body 22 also includes a plurality of third spokes 39 which each extend angularly from a respective one of the plurality of first spokes 36 to the rim 32. The plurality of first, second, and third spokes 36, 37, 39 preferably extend along the portions of the cast shock tower 20 which are identified as the most structurally important and thus required to be the strongest parts of the shock tower 20.

The plurality of spokes 36, 37, 39 define a plurality of voids 40 extending therebetween for removing a significant amount of steel material from the cast shock tower 20 and reducing an overall weight of the cast shock tower 20 component. The plurality of voids 40 are preferably disposed along portions of the shock tower 20 which have minimal structural importance and thus the absence of steel in these areas does not negatively impact the overall integrity of the cast shock tower 20. Thus, the plurality of voids 40 eliminates inefficiently used material from the prior art cast shock tower designs to reduce weight and cost for the cast shock tower 20.

The body 22 can also include at least one reinforcement wall 42 extending from the hub 24 to the rim 32 between adjacent ones of the plurality of first spokes 36. In some instances, the design of the cast shock tower 20 requires a large concentration of spokes 36 in a particular area to provide the necessary strength and reinforcement characteristics for the cast shock tower 20. In order to reduce the complexity of metal casting the shock tower with this complex design requirement, the large concentration of spokes can be replaced with the reinforcement wall 42 to carry or distribute the load in that particular area.

As best illustrated in FIGS. 1-5, the body 22 can also include at least one load-bearing extension 46, 48 which extends from the body 22 to an extension end 50', 50" for securement to another portion of the vehicle, such as a hinge pillar, door, or the like, for adding fore-aft stiffness to the cast shock tower 20. In a preferred arrangement, the at least one load-bearing extension 46, 48 includes a first load-bearing extension 46 which extends from the hub 24 to a first extension end 50' and a second load-bearing extension 48 which extends from one of the plurality of second spokes 37 to a second extension end 50". The at least one load-bearing extension 46, 48 can be integrally cast with the body 22. However, the at least one load-bearing extension 46, 48 can also be formed as a separate component from the integrally cast body 22, such as in the form of a steel tube, and then secured to the integrally cast body 22 via welding or the like.

Obviously, many modifications and variations of the present invention are possible in light of the above teachings and may be practiced otherwise than as specifically described while within the scope of the appended claims. Put another way, the foregoing invention has been described in accordance with the relevant legal standards, and thus the description is exemplary rather than limiting in nature. Variations and modifications to the disclosed embodiment may become apparent to those skilled in the art and fall within the scope of the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A shock tower for a vehicle, comprising:
a body defining an interior cavity and having an upper portion and a lower portion;
said body including a hub disposed along said upper portion and a rim extending around and along said lower portion;
said body including a plurality of spokes for distributing a load of the shock tower therebetween; and
said plurality of spokes defining a plurality of voids extending therebetween, wherein each of said plurality of voids being open to said interior cavity for eliminating material and reducing an overall weight of the shock tower.

2. A shock tower as set forth in claim 1, wherein said plurality of spokes includes a plurality of first spokes extending between said hub and said rim.

3. A shock tower as set forth in claim 2, wherein said plurality of spokes includes a plurality of second spokes extending at least partially around the body and transversely to respective ones of the plurality of first spokes to define a plurality of spoke junctions at each intersection of one of said plurality of second spokes with a respective one of said plurality of first spokes.

4. A shock tower as set forth in claim 3, wherein said plurality of spokes includes a plurality of third spokes each extending angularly from a respective one of said plurality of first spokes to said rim.

5. A shock tower as set forth in claim 1, wherein said body includes at least one reinforcement wall extending from said hub to said rim and disposed between adjacent ones of said plurality of first spokes.

6. A shock tower as set forth in claim 1, wherein said body is integrally cast from steel.

7. A shock tower as set forth in claim 6, wherein said rim is a cast steel wall.

8. A shock tower as set forth in claim 3, wherein said body includes at least one load-bearing extension extending from said body to an extension end for securement to a portion of the vehicle.

9. A shock tower as set forth in claim 8, wherein said at least one load-bearing extension includes a first load-bearing extension extending from said hub to a first extension end.

10. A shock tower as set forth in claim 8, wherein said at least one load-bearing extension includes a second load-bearing extension extending from one of said plurality of second spokes to a second extension end.

11. A shock tower as set forth in claim 1, wherein said hub defines a central opening for receiving an upper end of a strut or shock absorber.

12. A shock tower as set forth in claim 10, wherein said hub defines a plurality of fastener orifices for receiving a fastener to secure said hub to the upper end of the strut or shock absorber.

13. A shock tower as set forth in claim 10, wherein said at least one load-bearing extension is integrally cast with said body.

14. A shock tower for a vehicle, comprising:
a body defining an interior cavity and having an upper portion and a lower portion;
said body including a hub disposed along said upper portion and a rim extending around and along said lower portion;
said body including a plurality of first spokes extending between said hub and said rim for distributing a load of the shock tower;

said body including a plurality of second spokes extending at least partially around said body and transversely to respective ones of said plurality of first spokes to define a plurality of spoke junctions at each intersection of one of said plurality of second spokes with a respective one of said plurality of first spokes for allowing the distributed load to change directions at each of said spoke junctions; and said plurality of first spokes and said plurality of second spokes defining a plurality of voids extending therebetween, wherein each of said plurality of voids being open to said interior cavity for eliminating material and reducing an overall weight of the shock tower.

15. A shock tower as set forth in claim 14, wherein said body defines a plurality of third spokes each extending angularly from a respective one of said plurality of first spokes to said rim.

16. A shock tower as set forth in claim 14, wherein said body includes at least one reinforcement wall extending from said hub to said rim and disposed between adjacent ones of said plurality of first spokes.

17. A shock tower as set forth in claim 14, wherein said body includes at least one load-bearing extension extending from said body to an extension end for securement to a portion of the vehicle.

18. A shock tower as set forth in claim 17, wherein said at least one load-bearing extension includes a first load-bearing extension extending from said hub to a first extension end.

19. A shock tower as set forth in claim 17, wherein said at least one load-bearing extension includes a second load-bearing extension extending from one of said plurality of second spokes to a second extension end.

20. A shock tower as set forth in claim 14, wherein said body is integrally cast from steel.

* * * * *